(12) United States Patent
Watfa

(10) Patent No.: US 11,950,133 B2
(45) Date of Patent: Apr. 2, 2024

(54) METHOD AND APPARATUS FOR PERFORMING HEADER COMPRESSION IN A WIRELESS SYSTEM

(71) Applicant: Samsung Electronics Co., Ltd., Suwon-si (KR)

(72) Inventor: Mahmoud Watfa, Staines (GB)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 17/301,801

(22) Filed: Apr. 14, 2021

(65) Prior Publication Data
US 2021/0329491 A1  Oct. 21, 2021

(30) Foreign Application Priority Data

Apr. 15, 2020 (GB) .................................. 2005511
Apr. 16, 2020 (GB) .................................. 2005575

(51) Int. Cl.
*H04W 28/06* (2009.01)
*H04L 69/04* (2022.01)
*H04W 76/20* (2018.01)

(52) U.S. Cl.
CPC ............. *H04W 28/06* (2013.01); *H04L 69/04* (2013.01); *H04W 76/20* (2018.02)

(58) Field of Classification Search
CPC ....... H04W 28/06; H04W 76/20; H04W 4/18; H04W 36/00; H04W 40/36; H04W 52/02; H04L 69/04; H04L 1/0007; H04L 47/365; H04L 1/0014; H04L 69/32; H04L 67/5651; H04L 69/22; H03M 7/30
See application file for complete search history.

(56) References Cited

U.S. PATENT DOCUMENTS

| 11,284,320 B2 | 3/2022 | Kawasaki et al. | |
| 2019/0037441 A1* | 1/2019 | Liu ..................... | H04W 28/06 |
| 2019/0141776 A1* | 5/2019 | Kim ..................... | H04W 76/27 |

(Continued)

FOREIGN PATENT DOCUMENTS

WO   2019139089 A1   7/2019

OTHER PUBLICATIONS

International Search Report and Written Opinion of the International Searching Authority dated Jul. 23, 2021 in connection with International Application No. PCT/KR2021/004763, 9 pages.

(Continued)

*Primary Examiner* — Ian N Moore
*Assistant Examiner* — Latresa A McCallum

(57) ABSTRACT

In accordance an embodiment of the disclosure, a method performed by a user equipment (UE) in a wireless communication system is provided. The method may comprise: identifying an inter-system change from a first mode to a second mode, transferring a data session established in the first mode to the second mode from the first mode, determining whether the UE and a network entity in the second mode support a header compression, and initiating, based on a result of the identifying, a procedure for negotiating a header compression configuration in the transferred data session, wherein the first mode is one of N1 an mode or an S1 mode, and the second mode is the other of the N1 mode or the S1 mode.

17 Claims, 1 Drawing Sheet

(56) References Cited

U.S. PATENT DOCUMENTS

| | | | |
|---|---|---|---|
| 2019/0159157 A1* | 5/2019 | Gupta | H04W 60/005 |
| 2019/0191467 A1 | 6/2019 | Dao et al. | |
| 2019/0313310 A1* | 10/2019 | Won | H04W 36/30 |
| 2019/0313468 A1 | 10/2019 | Talebi Fard et al. | |
| 2019/0357037 A1* | 11/2019 | Velev | H04W 8/04 |
| 2021/0022024 A1* | 1/2021 | Yao | H04W 36/0085 |

OTHER PUBLICATIONS

Huawei et al., "Single-registration mode without N26," C1-202478, 3GPP TSG-CT WG1 Meeting #123-e, Electronic meeting, Apr. 16-24, 2020, 30 pages.

Qualcomm Incorporated, "Ethernet header compression for CP CIoT—5GMM aspects," C1-202425, 3GPP TSG-CT WG1 Meeting #123-e, Electronic meeting, Apr. 16-24, 2020, 12 pages.

Qualcomm Incorporated, "Ethernet header compression for CP CIoT—5GSM aspects," C1-202426, 3GPP TSG-CT WG1 Meeting #123-e, Electronic meeting, Apr. 16-24, 2020, 32 pages.

Supplementary European Search Report dated Jul. 12, 2023, in connection with EP Patent Application No. 21789107.6, 12 pages.

3GPP TS 24.501 V16.4.1 (Mar. 2020); Technical Specification; 3rd Generation Partnership Project; Technical Specification Group Core Network and Terminals; Non-Access-Stratum (NAS) protocol for 5G System (5GS); Stage 3; (Release 16); 666 pages.

Office Action dated Oct. 5, 2023 in connection with Japanese Patent Application No. 2022-562669, 8 pages.

Combined Search Report and Examination Report dated Sep. 4, 2020, in connection with United Kingdom Patent Application No. 2005575.2, 7 pages.

Examination Report dated Jul. 28, 2022, in connection with United Kingdom Patent Application No. 2005575.2, 3 pages.

Ericsson, "CP CIoT header compression, UE initiated re-configuration," 3GPP TSG-CT WG1 Meeting #120 C1-196588, Portoroz (Slovenia), Oct. 2019, 6 pages.

Vodafone, "Applicability of NR-IIoT L2/3 aspects for LTE," 3GPP TSG RAN #83 RP-190529, Shenzhen, China, Mar. 2019, 2 pages.

\* cited by examiner

METHOD AND APPARATUS FOR PERFORMING HEADER COMPRESSION IN A WIRELESS SYSTEM

CROSS-REFERENCE TO RELATED APPLICATIONS

The application is based on and claims priority under 35 U.S.C. § 119(a) of a Great Britain patent application number 2005511.7, filed on Apr. 15, 2020 and a Great Britain patent application number 2005575.2, filed on Apr. 16, 2020. The disclosure of which is incorporated by reference herein in its entirety.

BACKGROUND

1. Field

The disclosure relates to provide methods, apparatus and systems for data session multi-mode interworking in a network. More particularly, the disclosure relates to interworking between $5^{th}$ generation systems (5GS) and evolved packet switched system (EPS) for protocol data unit (PDU) sessions that use header compression in $3^{rd}$ generation partnership project 5G (3GPP 5G).

2. Description of Related Art

To meet the demand for wireless data traffic having increased since deployment of 4th generation (4G) communication systems, efforts have been made to develop an improved 5th generation (5G) or pre-5G communication system. The 5G or pre-5G communication system is also called a 'beyond 4G network' or a 'post long term evolution (LTE) system'. The 5G communication system is considered to be implemented in higher frequency (mmWave) bands, e.g., 60 GHz bands, so as to accomplish higher data rates. To decrease propagation loss of the radio waves and increase the transmission distance, beamforming, massive multiple-input multiple-output (MIMO), full dimensional MIMO (FD-MIMO), array antenna, analog beamforming, and large scale antenna techniques are discussed with respect to 5G communication systems. In addition, in 5G communication systems, development for system network improvement is under way based on advanced small cells, cloud radio access networks (RANs), ultra-dense networks, device-to-device (D2D) communication, wireless backhaul, moving network, cooperative communication, coordinated multi-points (CoMP), reception-end interference cancellation and the like. In the 5G system, hybrid frequency shift keying (FSK) and Feher's quadrature amplitude modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

The Internet, which is a human centered connectivity network where humans generate and consume information, is now evolving to the Internet of things (IoT) where distributed entities, such as things, exchange and process information without human intervention. The Internet of everything (IoE), which is a combination of the IoT technology and the big data processing technology through connection with a cloud server, has emerged. As technology elements, such as "sensing technology", "wired/wireless communication and network infrastructure", "service interface technology", and "security technology" have been demanded for IoT implementation, a sensor network, a machine-to-machine (M2M) communication, machine type communication (MTC), and so forth have been recently researched. Such an IoT environment may provide intelligent Internet technology services that create a new value to human life by collecting and analyzing data generated among connected things. IoT may be applied to a variety of fields including smart home, smart building, smart city, smart car or connected cars, smart grid, health care, smart appliances and advanced medical services through convergence and combination between existing information technology (IT) and various industrial applications.

In line with this, various attempts have been made to apply 5G communication systems to IoT networks. For example, technologies such as a sensor network, MTC, and M2M communication may be implemented by beamforming, MIMO, and array antennas. Application of a cloud RAN as the above-described big data processing technology may also be considered to be as an example of convergence between the 5G technology and the IoT technology.

As described above, various services can be provided according to the development of a wireless communication system, and thus a method for easily providing such services is required.

SUMMARY

In accordance an embodiment of the disclosure, a method performed by a user equipment (UE) in a wireless communication system is provided. The method may comprise: identifying an inter-system change from a first mode to a second mode, transferring a data session established in the first mode to the second mode from the first mode, determining whether the UE and a network entity in the second mode support a header compression, and initiating, based on a result of the identifying, a procedure for negotiating header compression configuration in the transferred data session, wherein the first mode is one of an N1 mode or an S1 mode and the second mode is the other of the N1 mode or the S1 mode.

In an embodiment of the disclosure, the method may comprise transmitting, to the network entity, a first message including first information related to whether the header compression is supported by the UE, receiving, from the network entity, a second message including second information related to whether the header compression is supported by the network entity, and determining, based on the first information and the second information, whether the UE and the network entity support the header compression.

In an embodiment of the disclosure, the first message may include a capability information element (IE), and the first information is indicated by a bit included in the capability IE and the bit may indicate a value of 1 when the header compression is supported and the bit indicates a value of 0 when the header compression is not supported.

In an embodiment of the disclosure, the second message may include a network feature support information element (IE), and the second information is indicated by a bit included in the network feature support IE and the bit may indicate a value of 1 when the header compression is supported and the bit indicates a value of 0 when the header compression is not supported.

In an embodiment of the disclosure, the method may comprise initiating the procedure for negotiating the header compression configuration in the transferred data session when the UE operates in a single-registration mode and an N26 interface is supported.

In an embodiment of the disclosure, the header compression may be IP header compression when the first mode is an N1 mode and the second mode is an S1 mode. In an embodiment of the disclosure, the header compression is one of IP header compression or Ethernet header compression when the first mode is the S1 mode and the second mode is the N1 mode.

In accordance an embodiment of the disclosure, a method performed by a network entity communicating with a user equipment (UE) in a wireless communication system is provided. The method may comprise: identifying an inter-system change from a first mode to a second mode, transferring a data session established in the first mode to the second mode from the first mode, determining whether the UE and a network entity in the second mode support a header compression, and initiating, based on a result of the identifying, a procedure for negotiating header compression configuration in the transferred data session, wherein the first mode is one of an N1 mode or an S1 mode and the second mode is the other of the N1 mode or the S1 mode.

In an embodiment of the disclosure, the method may comprise transmitting, to the network entity, a first message including first information related to whether the header compression is supported by the UE, receiving, from the network entity, a second message including second information related to whether the header compression is supported by the network entity, and determining, based on the first information and the second information, whether the UE and the network entity support the header compression.

In an embodiment of the disclosure, the first message may include a capability information element (IE), and the first information is indicated by a bit included in the capability IE and the bit may indicate a value of 1 when the header compression is supported and the bit indicates a value of 0 when the header compression is not supported.

In an embodiment of the disclosure, the second message may include a network feature support information element (IE), and the second information is indicated by a bit included in the network feature support IE and the bit may indicate a value of 1 when the header compression is supported and the bit indicates a value of 0 when the header compression is not supported.

In an embodiment of the disclosure, the method may comprise initiating the procedure for negotiating the header compression configuration in the transferred data session when the UE operates in a single-registration mode and an N26 interface is supported.

In an embodiment of the disclosure, the header compression may be IP header compression when the first mode is an N1 mode and the second mode is an S1 mode. In an embodiment of the disclosure, the header compression is one of IP header compression or Ethernet header compression when the first mode is the S1 mode and the second mode is the N1 mode.

In an embodiment of the disclosure, a user equipment (UE) in a wireless communication system is provided. The UE may comprise a transceiver and at least one processor configured to: identify an inter-system change to a second mode from a first mode, transfer a data session established in the first mode from the first mode to the second mode, determine whether the UE and a network entity in the second mode support a header compression, and initiate based on a result of the determination, a procedure for negotiating header compression configuration in the transferred data session, wherein the first mode is one of an N1 mode or an S1 mode and the second mode is the other of the N1 mode or the S1 mode.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

The above and other aspects, features and advantages of certain embodiments of the disclosure will be more apparent from the following description taken in conjunction with the accompanying drawings, in which.

DETAILED DESCRIPTION

Figure 1:
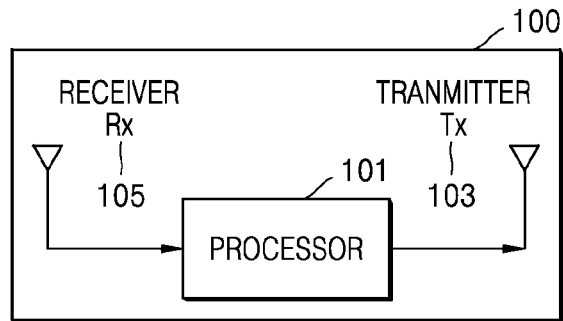
FIG. 1 illustrates a block diagram of an exemplary network entity according to an embodiment of the present disclosure.
Figure 2:
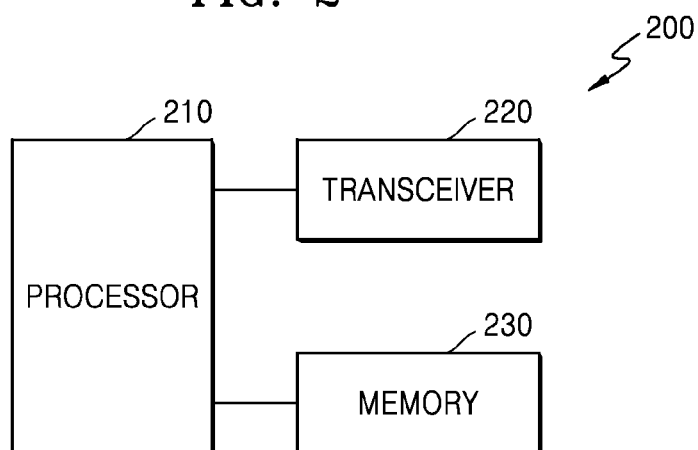
FIG. 2 illustrates a block diagram of a UE according to an embodiment of the present disclosure.
Figure 3:
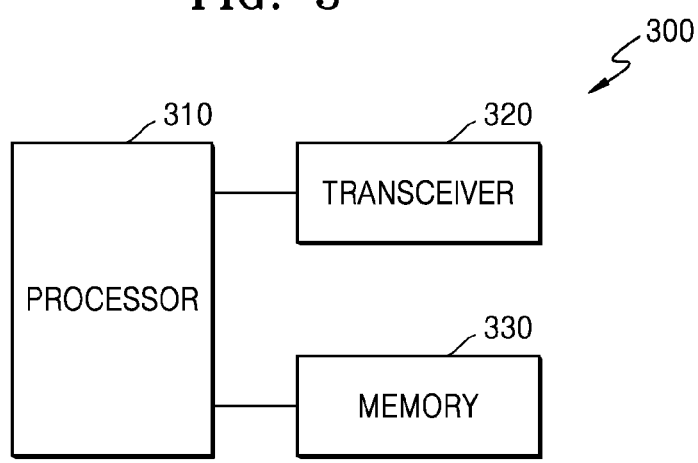
FIG. 3 illustrates a block diagram of a core network entity according to an embodiment of the present disclosure.

FIGS. 1 through 3, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

Throughout the disclosure, the expression "at least one of a, b or c" indicates only a, only b, only c, both a and b, both a and c, both b and c, all of a, b, and c, or variations thereof. Throughout the specification, a layer (or a layer apparatus) may also be referred to as an entity. Hereinafter, operation principles of the disclosure will be described in detail with reference to accompanying drawings. In the following descriptions, well-known functions or configurations are not described in detail because they would obscure the disclosure with unnecessary details. The terms used in the specification are defined in consideration of functions used in the disclosure and can be changed according to the intent or commonly used methods of users or operators. Accordingly, definitions of the terms are understood based on the entire descriptions of the present specification.

For the same reasons, in the drawings, some elements may be exaggerated, omitted, or roughly illustrated. Also, a size of each element does not exactly correspond to an actual size of each element. In each drawing, elements that are the same or are in correspondence are rendered the same reference numeral.

Advantages and features of the disclosure and methods of accomplishing the same may be understood more readily by reference to the following detailed descriptions of embodiments and accompanying drawings of the disclosure. The disclosure may, however, be embodied in many different forms and should not be construed as being limited to the embodiments set forth herein; rather, these embodiments of the disclosure are provided so that this disclosure will be thorough and complete, and will fully convey the concept of the disclosure to one of ordinary skill in the art. Therefore, the scope of the disclosure is defined by the appended claims. Throughout the specification, like reference numerals refer to like elements. It will be understood that blocks in flowcharts or combinations of the flowcharts may be performed by computer program instructions. Because these computer program instructions may be loaded into a processor of a general-purpose computer, a special-purpose computer, or another programmable data processing apparatus, the instructions, which are performed by a processor of a computer or another programmable data processing apparatus, create units for performing functions described in the flowchart block(s).

The computer program instructions may be stored in a computer-usable or computer-readable memory capable of directing a computer or another programmable data processing apparatus to implement a function in a particular manner, and thus the instructions stored in the computer-usable or computer-readable memory may also be capable of producing manufactured items containing instruction units for performing the functions described in the flowchart block(s). The computer program instructions may also be loaded into a computer or another programmable data processing apparatus, and thus, instructions for operating the computer or the other programmable data processing apparatus by generating a computer-executed process when a series of operations are performed in the computer or the other programmable data processing apparatus may provide operations for performing the functions described in the flowchart block(s).

In addition, each block may represent a portion of a module, segment, or code that includes one or more executable instructions for executing specified logical function(s). It is also noted that, in some alternative implementations, functions mentioned in blocks may occur out of order. For example, two consecutive blocks may also be executed simultaneously or in reverse order depending on functions corresponding thereto.

As used herein, the term "unit" denotes a software element or a hardware element such as a field-programmable gate array (FPGA) or an application-specific integrated circuit (ASIC), and performs a certain function. However, the term "unit" is not limited to software or hardware. The "unit" may be formed so as to be in an addressable storage medium, or may be formed so as to operate one or more processors. Thus, for example, the term "unit" may include elements (e.g., software elements, object-oriented software elements, class elements, and task elements), processes, functions, attributes, procedures, subroutines, segments of program code, drivers, firmware, micro-codes, circuits, data, a database, data structures, tables, arrays, or variables.

Functions provided by the elements and "units" may be combined into the smaller number of elements and "units", or may be divided into additional elements and "units". Furthermore, the elements and "units" may be embodied to reproduce one or more central processing units (CPUs) in a device or security multimedia card. Also, in an embodiment of the disclosure, the "unit" may include at least one processor. In the following descriptions of the disclosure, well-known functions or configurations are not described in detail because they would obscure the disclosure with unnecessary details.

Hereinafter, for convenience of explanation, the disclosure uses terms and names defined in the 3rd generation partnership project long term evolution (3GPP LTE) standards. However, the disclosure is not limited to the terms and names, and may also be applied to systems following other standards.

In the disclosure, an evolved node B (eNB) may be interchangeably used with a next-generation node B (gNB) for convenience of explanation. That is, a base station (BS) described by an eNB may represent a gNB. In the following descriptions, the term "base station" refers to an entity for allocating resources to a user equipment (UE) and may be used interchangeably with at least one of a gNode B, an eNode B, a node B, a base station (BS), a radio access unit, a base station controller (BSC), or a node over a network. The term "terminal" may be used interchangeably with a user equipment (UE), a mobile station (MS), a cellular phone, a smartphone, a computer, or a multimedia system capable of performing communication functions. However, the disclosure is not limited to the aforementioned examples. In particular, the disclosure is applicable to 3GPP new radio (NR) (or 5th generation (5G)) mobile communication standards. In the following description, the term eNB may be interchangeably used with the term gNB for convenience of explanation. That is, a base station explained as an eNB may also indicate a gNB. The term UE may also indicate a mobile phone, NB-IoT devices, sensors, and other wireless communication devices.

Herein, the following documents are referenced: [1] 3GPP TS 24.301 V16.4.0; and [2] 3GPP TS 24.501 V16.4.1.

Various acronyms, abbreviations and definitions used in the present disclosure are defined at the end of this description.

Support of Ethernet Data Transfer Over EPS and 5GS

Both EPS and 5GS support the transfer of Ethernet data as part of control plane cellular internet of things (CIoT) optimization.

In EPS, when the UE requests the establishment of a packet date network (PDN) connection the UE may indicate the type of data to be transferred over the requested PDN connection by specifying a value for the PDN type field in the PDN connectivity request message (see [1]). The PDN type value can indicate "Ethernet" (amongst other values) thereby indicating the PDN connection is requested to transfer Ethernet data (see section 9.9.4.10 of [1]).

Similarly, when the UE requests the establishment of a PDU session in 5GS, the UE may indicate the type of data to be transferred over the requested session by indicating a value for the PDU session type field in the PDU session establishment request message (see [1]). Again, "Ethernet" is one of the values (amongst others) that can be set for the PDU session type field (see section 9.11.4.11 of [2]).

PDN connections that are established in an S1 mode (i.e., in EPS) can be transferred to 5GS (i.e., an N1 mode) when the UE moves from the S1 mode to the N1 mode. Similarly, PDU sessions established in the N1 mode can be transferred to the S1 mode.

For example, when sessions are moved from an N1 mode to an S1 mode, the UE has to set certain parameters (e.g., the PDU session type would become the PDN connection type for the transferred session, etc.) according to some rules that are defined in [2]. Below is an excerpt from [2] showing how the corresponding parameters for a transferred PDN connection, from the N1 mode to the S1 mode, are set to the corresponding parameters of the PDU session that is to be transferred from the N1 mode to the S1 mode. Section 6.1.4.1 contains the complete description of such handling at interworking with EPS.

The UE uses the parameters from each PDU session for which interworking with EPS is supported to create corresponding default EPS bearer context and optionally dedicated EPS bearer context(s) as follows:

a) the PDU session type of the PDU session shall be mapped to the PDN type of the default EPS bearer context as follows:

1) the PDN type shall be set to "non-IP" if the PDU session type is "Unstructured";

2) the PDN type shall be set to "IPv4" if the PDU session type is "IPv4";

3) the PDN type shall be set to "IPv6" if the PDU session type is "IPv6";

4) the PDN type shall be set to "IPv4v6" if the PDU session type is "IPv4v6";

5) the PDN type shall be set to "non-IP" if the PDU session type is "Ethernet," and the UE, the network or both of them do not support Ethernet PDN type in an S1 mode; and 6) the PDN type shall be set to "Ethernet" if the PDU session type is "Ethernet" and the UE and the network support Ethernet PDN type in an S1 mode;

b) the PDU address of the PDU session shall be mapped to the PDN address of the default EPS bearer context as follows:

1) the PDN address of the default EPS bearer context is set to the PDU address of the PDU session, if the PDU session type is "IPv4," "IPv6" or "IPv4v6"; and 2) the PDN address of the default EPS bearer context is set to zero, if the PDU session type is "Ethernet" or "Unstructured";

c) the data network name (DNN) of the PDU session shall be mapped to the access point name (APN) of the default EPS bearer context;

d) the access point-aggregate maximum bit rate (APN-AMBR) and extended APN-AMBR received in the parameters of the default EPS bearer context of the mapped EPS bearer contexts shall be mapped to the APN-AMBR and extended APN-AMBR of the default EPS bearer context;

e) for each PDU session in state PDU SESSION ACTIVE, PDU SESSION MODIFICATION PENDING or PDU SESSION INACTIVE PENDING the UE shall set the state of the mapped EPS bearer context(s) to BEARER CONTEXT ACTIVE; and f) for any other PDU session the UE shall set the state of the mapped EPS bearer context(s) to BEARER CONTEXT INACTIVE.

As indicated above, when sessions transferred from an N1 mode to an S1 mode, the value of the PDN type is set to the value of the PDU session type, and moreover, the PDN type may be set to "Ethernet" if the PDU session type is "Ethernet" and the UE and the network support Ethernet PDN type in the S1 mode.

IP Header Compression for Control Plane CIoT Optimization.

As part of CIoT optimization in EPS and 5GS, IP header compression was defined to enable compression of IP data that is sent over the control plane. The support of IP header compression and the actual configuration to use for IP header compression is negotiated between the UE and the network so that the support of IP header compression and the actual configuration can be applied accordingly at both ends.

For example, in 5GS, the support of IP header compression for control plane CIoT 5GS optimization is indicated by the UE in the 5G mobility management (5GMM) capability IE (see [2]). The support (and acceptance by the network to use IP header compression for a UE) in indicated by the network in the 5GS network feature support IE (see [2]). If allowed by the network, the UE negotiates the header compression configuration parameters as part of the PDU session establishment procedure, or the UE can re-negotiate these parameters as part of the PDU session modification procedure.

Note that similar functionalities are also defined in EPS i.e., the indication of support of IP header compression for control plane CIoT EPS optimization by the UE, the indication of support of IP header compression for control plane CIoT EPS optimization by the network (and allowance of the use of header compression), and the negotiation of the configuration parameters between the UE and the network, see [1]. Similarly, in EPS, the negotiation of the parameters occur during the establishment of a PDN connection or during the modification of a PDN connection (see [1]).

Ethernet Header Compression for Control Plane CIoT Optimization.

Ethernet header compression is not yet specified in either [1] or [2]. Recently, it has been proposed in [2] to apply header compression to Ethernet data over the control plane. The 3GPP standard specifications (see [1] and [2]) introduce the capability indication and negotiation to use the feature between the UE and the network at the 5GMM layer, and the exchange of the compression parameters at the 5G session management (5GSM) layer.

It is an aim of certain examples of the present disclosure to address, solve and/or mitigate, at least partly, at least one of the problems and/or disadvantages associated with the related art, for example at least one of the problems and/or disadvantages described herein. It is an aim of certain examples of the present disclosure to provide at least one advantage over the related art, for example at least one of the advantages described herein.

Other aspects, advantages, and salient features will become apparent to those skilled in the art from the following detailed description, taken in conjunction with the annexed drawings, which disclose examples of the present disclosure.

The following description of examples of the present disclosure, with reference to the accompanying drawings, is provided to assist in a comprehensive understanding of the present disclosure, as defined by the claims. The description includes various specific details to assist in that understanding but these are to be regarded as merely exemplary. Accordingly, those of ordinary skill in the art will recognize that various changes and modifications of the examples described herein can be made without departing from the scope of the present disclosure.

The same or similar components may be designated by the same or similar reference numerals, although they may be illustrated in different drawings.

Detailed descriptions of techniques, structures, constructions, functions or processes known in the art may be omitted for clarity and conciseness, and to avoid obscuring the subject matter of the present disclosure.

The terms and words used herein are not limited to the bibliographical or standard meanings, but are merely used to enable a clear and consistent understanding of the present disclosure.

Herein, the words "comprise", "include" and "contain" and variations of the words, for example "comprising" and "comprises", means "including but not limited to", and is not intended to (and does not) exclude other features, elements, components, integers, steps, processes, operations, functions, characteristics, properties and/or groups thereof.

Herein, the singular form, for example "a", "an" and "the", encompasses the plural unless the context otherwise requires. For example, reference to "an object" includes reference to one or more of such objects.

Herein, language in the general form of "X for Y" (where Y is some action, process, operation, function, activity or step and X is some means for carrying out that action, process, operation, function, activity or step) encompasses means X adapted, configured or arranged specifically, but not necessarily exclusively, to do Y.

Features, elements, components, integers, steps, processes, operations, functions, characteristics, properties and/or groups thereof described or disclosed in conjunction with a particular aspect, embodiment, example or claim of the present disclosure are to be understood to be applicable to any other aspect, embodiment, example or claim described herein unless incompatible therewith.

Certain examples of the present disclosure provide methods, apparatus and systems for data session multi-mode interworking in a network. The following examples are applicable to, and use terminology associated with, 3GPP 5G. For example, certain examples of the present disclosure provide methods, apparatus and systems for interworking between 5GS and EPS for PDU sessions that use header compression in 3GPP 5G. However, the skilled person will appreciate that the techniques disclosed herein are not limited to these examples or to 3GPP 5G and may be applied in any suitable system or standard, for example one or more existing and/or future generation wireless communication systems or standards.

For example, the functionality of the various network entities and other features disclosed herein may be applied to corresponding or equivalent entities or features in other communication systems or standards. Corresponding or equivalent entities or features may be regarded as entities or features that perform the same or similar role, function, operation or purpose within the network. For example, the functionality of a mobility management entity/session management function (MME/SMF) in the examples below may be applied to any other suitable type of entity performing mobility/session management functions.

The skilled person will appreciate that the present disclosure is not limited to the specific examples disclosed herein. For example:

The techniques disclosed herein are not limited to 3GPP 5G.

One or more entities in the examples disclosed herein may be replaced with one or more alternative entities performing equivalent or corresponding functions, processes or operations.

One or more of the messages in the examples disclosed herein may be replaced with one or more alternative messages, signals or other type of information carriers that communicate equivalent or corresponding information.

One or more further elements, entities and/or messages may be added to the examples disclosed herein.

One or more non-essential elements, entities and/or messages may be omitted in certain examples.

The functions, processes or operations of a particular entity in one example may be divided between two or more separate entities in an alternative example.

The functions, processes or operations of two or more separate entities in one example may be performed by a single entity in an alternative example.

Information carried by a particular message in one example may be carried by two or more separate messages in an alternative example.

Information carried by two or more separate messages in one example may be carried by a single message in an alternative example.

The order in which operations are performed may be modified, if possible, in alternative examples.

The transmission of information between network entities is not limited to the specific form, type and/or order of messages described in relation to the examples disclosed herein.

Certain examples of the present disclosure may be provided in the form of an apparatus/device/network entity configured to perform one or more defined network functions and/or a method therefor. Certain examples of the present disclosure may be provided in the form of a system (e.g., a network) comprising one or more such apparatuses/devices/network entities, and/or a method therefor. For example, in the following examples, a network may include a UE, access and mobility management function (AMF), SMF and/or MME.

At least the following problems exist in view of the related art:

Lack of any Specification Regarding the Application of Header Compression for Sessions that Get Transferred Across EPS and 5GS It is currently not specified what the UE or network may do or assume regarding header compression for sessions that get transferred across or between EPS and 5GS. Although it may be expected that header compression may continue to apply across these systems, the local policies in each system may be different. This problem may be more marked for Ethernet header compression which is not introduced in EPS. This then raises the question: if header compression is applied in 5GS, how can the UE apply header compression in EPS when the latter does not have mechanisms (i.e., signaling) to negotiate the use of Ethernet header compression, and if allowed the actual parameters for Ethernet compression?

Certain examples of the present disclosure address this problem, for which there is no clear description for the UE or the network thereby leading to unpredictable behavior.

In view of the above problem, certain examples of the present disclosure provide one or more of the following solutions.

Header compression for Ethernet data is only applicable to 5GS. Hence when a session is transferred to EPS the UE stops the use of header compression. The UE may renegotiate header compression parameters after returning again to 5GS.

New parameters may be introduced for negotiating the support and use of Ethernet header compression in EPS. Accordingly, the UE may continue using header compression parameters when a session is transferred from 5GS to EPS.

The UE may always renegotiate header compression parameters (e.g., for IP or Ethernet data) at every inter-system change across the systems, or after the first inter-system change from EPS to 5GS and for sessions that were first established in EPS.

Ethernet header compression parameters for a target system (e.g., 5GS) may be provided to the UE using the (extended) protocol configuration options IE when the UE is in a source system (e.g., EPS) such that the UE uses these parameters after an inter-system change from the source system (e.g., EPS) to a target system (e.g., 5GS).

New IEs may be introduced in the none access stratum (NAS) messages in EPS (e.g., for the EPS mobility management (EMM) NAS messages and EPS session management (ESM) NAS messages) so that the UE and network can indicate their support for Ethernet header compression, and if supported the UE and network can negotiate the parameters to use.

Certain examples of the present disclosure will now be described in more detail.

1. By Default, Ethernet Header Compression Only Applies to 5GS.

Certain examples of the present disclosure may apply a default behavior. For example, when a PDU session is established in 5GS and Ethernet header compression is supported and allowed for the UE, then the UE may assume that Ethernet header compression applies to the PDU session in 5GS only (i.e., an N1 mode). Therefore, when the UE moves to EPS (i.e., an S1 mode) and transfers the session, the UE cannot assume that Ethernet header compression applies in EPS. Hence if the session is transferred successfully from the N1 mode to the S1 mode, the UE may use the session for Ethernet data transfer but does not apply header compression.

Alternatively, the UE, after accessing an S1 mode, may negotiate the use of Ethernet header compression in EPS when sending the tracking area update (TAU) request message and indicate whether Ethernet header compression for control plane CIoT EPS optimization is supported. The UE may also send this IE and set the provided new bit accordingly when the UE sends the attach request message in the S1 mode.

To do so, a new bit may be provided in the UE network capability IE. For example, this bit may be called Ethernet header compression for control plane CIoT EPS optimization (EHC-CP CIoT), where for example the value "1" indicates "Ethernet header compression for control plane CIoT EPS optimization supported" and "0" indicates "Ethernet header compression for control plane CIoT EPS optimization not supported."

Similarly, the network (MME) may indicate whether Ethernet header compression is supported and allowed for use by the UE. To do so a new bit may be provided in the EPS network feature support IE. For example, this bit may be called Ethernet header compression for control plane CIoT EPS optimization (EHC-CP CIoT), where for example the value "1" indicates "Ethernet header compression for control plane CIoT EPS optimization supported" and "0" indicates "Ethernet header compression for control plane CIoT EPS optimization not supported." When the network indicates that the feature is supported then the network may also implicitly indicate that the UE is allowed to use the feature.

An IE with a new bit as described above may be sent by the MME in the TAU accept message or attach accept message.

After an inter-system change from an N1 mode to an S1 mode, the UE may negotiate the use of Ethernet header compression, for example as described above. If the network indicates that Ethernet header compression is not supported (for example as described above), then the UE may autonomously, for each of the PDU session that has been transferred from the N1 mode to the S1 mode and for which Ethernet header compression was applied in the N1 mode, stop the use of Ethernet header compression (and hence transfer Ethernet data without header compression). The UE may store the Ethernet header compression parameters that were negotiated with each SMF while in the N1 mode for a potential reuse of these parameters when the UE goes back from the S1 mode to the N1 mode and transfer the PDN connection (or PDU session) to the N1 mode. Alternatively, the UE may discard the parameters. Upon inter-system change (back) to the N1 mode, the UE may re-negotiate the use of Ethernet header compression with the network at both the 5GMM layer and the 5GSM layer as described further below. In one embodiment, if the UE had stored the parameters and the UE comes back to 5GS and transfers the PDU session, the UE may continue using the header compression parameters without necessarily performing a PDU session modification procedure to (re-)negotiate these parameters. In one embodiment the UE may do so if the UE and the AMF successfully negotiate to use header compression as part of the registration procedure.

In an S1 mode, if the network indicates that Ethernet header compression is supported, then the UE may continue using the header compression parameters (that were negotiated in 5GS) for the PDN connection (e.g., for Ethernet data or IP data) that is transferred without a need to re-negotiate the parameters with the core network.

In general, the UE, for any session that has been deemed to be transferable from one system to another, the UE may set the parameters for IP header compression in the target system to the IP header compression parameters of the source system. This may be done, for example as described further below.

Alternatively, even if the MME indicates that Ethernet header compression is supported in the EPS network feature support IE, the UE may re-negotiate the compression parameters for every PDN connection that is transferred to an S1 mode.

The skilled person will appreciate that the techniques described herein may be applied in both directions, i.e., for PDU sessions (or PDN connections) that get transferred from an N1 mode to an S1 mode, or from the S1 mode to the N1 mode.

Moreover, the skilled person will appreciate that the techniques described herein may be applied for IP header compression for control plane CIoT optimization.

Currently, the EPS does support signaling for IP header compression as discussed above. Similarly, 5GS supports signaling for IP header compression as discussed above. However, even for IP header compression, it is not specified what the UE behavior may be when the UE moves across an S1 mode and an N1 mode and transfers the PDN connections (or PDU sessions) across the EPS and 5GS systems. The skilled person will appreciate that the technique described herein may also be applied to IP header compression.

For example, since the signaling and support of IP header compression is already supported in both systems, the UE may autonomously keep using the same IP header compression parameters when the UE moves between 5GS and EPS and transfer a session between an N1 mode and an S1 mode (or vice versa). Alternatively, as described above, the UE may still negotiate the header compression parameters when moving into a target system when the network indicates the support (and implicitly indicates allowance) of the use of the feature.

Alternatively, for a PDU session for which the PDU type is Ethernet and for which the use of Ethernet header compression is allowed, the UE may consider that such a PDU session is not transferable to EPS even if all the other criteria for such a determination are met. In one embodiment, if other criteria for transferability to a target system (e.g., an S1 mode) are met, the UE may transfer the session but may not use Ethernet header compression in the target system.

To apply the parameters received in a source system to a target system, the following may be performed.

In the following example, it is first assumed that the UE is in 5GS and has a PDU session that uses header compression.

Both the UE and the AMF may consider that the header compression parameters are not per PDU session but rather for a particular quality of service (QoS) flow that is identified by a QoS flow identifier (QFI) (within a PDU session). In one embodiment, by default, the header compression parameters that may be associated with QoS flow may be the default QoS flow, i.e., the QFI of the default QoS rule.

The UE may consider the received header compression parameters to be associated with a QFI of the PDU session, and optionally that may be the QFI of the default QoS rule. For an S1 mode (optionally when the UE moves from an N1 mode to the S1 mode and transfers the PDU session), the UE may also consider that the header compression parameters are associated with EPS bearer identity that is associated with the QFI for which the header compression parameters are received in the N1 mode. In one embodiment, by default, the UE may consider that the header compression parameters are associated with the EPS bearer identity of the default EPS bearer. As such, for a PDU session in 5GS, the header compression parameters of the PDU session (or of a QoS flow that is identified by a QFI, optionally the QFI of the default QoS rule) may map to the header compression parameters of the EPS bearer identity that is associated with the QFI (optionally the QFI of the default QoS rule, and hence optionally the EPS bearer identity is the EPS bearer identity of the default EPS bearer).

In the following, it is now assumed the UE is in EPS and establishes a PDN connection that uses header compression. Similarly, for a UE in EPS, the header compression parameters may be considered to be associated with an EPS bearer identity. Hence, the UE (e.g., at inter-system change from an S1 mode to an N1 mode) may consider that the received header compression parameters are also associated with the QoS flow, that is identified by the QFI, which is associated with the EPS bearer identity for which the header compression parameter is received. In one embodiment, the association between the EPS bearer identity and the QoS rule may be via a QFI which may be sent in the QoS flow description that contains the EPS bearer identity and QFI. Hence, the QoS rule that associates with the EPS bearer identity may be determined by the QFI in the QoS flow description containing the EPS bearer identity.

In one embodiment, at inter-system change from an S1 mode to an N1 mode, the UE may associate the header compression parameters with the PDU session that is identified by the PDU session identifier (ID) parameter in the (E)PCO IE that was received while in EPS (i.e., an S1 mode).

The skilled person will appreciate that the technique described above may be applied to IP header compression and/or Ethernet header compression as well.

As such, when the UE moves from an S1 mode to an N1 mode and transfers a PDU session, the UE may associate the header compression parameters to the QoS flow (or QoS rule) identified by the QFI that is associated with the EPS bearer identity for which the header compression parameters are received in EPS.

The skilled person will appreciate that the techniques described above may be applied to IP header compression parameters and/or Ethernet header compression parameters, or any other header compression parameters that are defined, or may be defined in the future.

In certain examples of the present disclosure, the network may indicate the QFI that is associated with the header compression parameters whenever the network sends the header compression parameters to the UE in any 5GSM message. This may be done in any suitable way, for example the IE that carries the header compression parameters (e.g., the Header compression configuration IE, or any other suitable name that may be given to such an IE) may contain a field that indicates the QFI for which the parameters are associated to. Alternatively, the QoS flow descriptions IE may include a field to contain an indication that the QFI of a QoS flow description is associated with the header compression parameters. Alternatively, the QoS flow description may include a new parameter which is the header compression parameter that is associated with the QFI.

2. Renegotiation of the Header Compression Parameters Once in a Target System.

In certain examples of the present disclosure, the following UE behavior may be applied when the UE behavior enters a target system, where the target system may be an S1 mode (e.g., after an inter-system change from an N1 mode) or the target system may be the N1 mode (e.g., after an inter-system change from the S1 mode).

The following description refers to IP header compression. However, the skilled person will appreciate that these techniques may be applied to Ethernet header compression.

Assume that a PDN connection is first established in an S1 mode (i.e., the connection was not a result of a transfer of a PDU session from an N1 mode to an S1 mode) and for which the UE and network may have negotiated the use of IP header compression. Upon an inter-system change to a target system, i.e., the N1 mode for this example (where the techniques described herein may also be applied for the opposite case), the UE may re-negotiate the IP header compression parameters with each SMF for which a corresponding PDU session is transferred. This may be done in addition to the negotiation at the 5GMM layer as described above and as per the current behavior in [2]. Hence, to negotiate the parameters with the SMF, the UE may perform a PDU session modification procedure after the first inter-system change to the target system (i.e., in this example, after the first inter-system change from the S1 mode to the N1 mode) to re-negotiate the header compression parameters. In one embodiment, the UE may always re-negotiate these parameters after every inter-system change. Hence, the support of header compression and the existence of a PDU session for which header compression was applied in the source system (or for which no header compression was applied in the source system) may be a trigger for performing a PDU session modification procedure (i.e., the UE may send the PDU session modification request message) to (re-)negotiate the header compression parameters in the target system (e.g., in the N1 mode). Alternatively, if header compression was used in the source system and modified at least once in the source system, then this may be a trigger for the UE to re-negotiate these parameters by initiating the PDU session modification procedure in the N1 mode.

The skilled person will appreciate that a technique in which the UE performs a PDU session modification procedure, after an inter-system change from an S1 mode to an N1 mode, may be applied with the techniques described above under the heading "By default, Ethernet header compression only applies to 5GS", i.e., if the session is first established in the N1 mode, and the UE transfers the session to the S1 mode, then when the UE returns back to the N1 mode the UE may perform the PDU session modification procedure to negotiate the header compression parameters with the network.

Similarly, when the UE performs an inter-system change from an N1 mode to an S1 mode, the UE may perform a bearer resource modification procedure (e.g., send a BEARER RESOURCE MODIFICATION REQUEST message) to negotiate the compression parameters for the PDN connection or per EPS bearer. The same triggers for performing a PDU session modification as described herein (after inter-system change to the N1 mode) may also be applied in EPS (i.e., after inter-system change to the S1 mode) such that the UE may perform the bearer resource modification procedure to negotiate the compression parameters.

In certain examples of the present disclosure, while the UE is in 5GS, as part of either the PDU session establishment procedure, or as part of the PDU session modification procedure, the network (SMF in this case) may provide the header compression parameters (for example for IP header compression or Ethernet header compression) for the target system in the protocol configuration option (PCO) IE or the extended PCO IE (EPCO IE). For example, when the UE is in an N1 mode, the SMF may send the configuration parameters for the target system if the PDU session is to be transferred to EPS. This then enables the UE to know these parameters ahead of time. Hence, when in the target system (in this case an S1 mode) and the network informs the UE that header compression is allowed (on the EMM layer) then the UE may use the received parameters to perform header compression.

Herein, the term "header compression" may mean header compression parameters for IP (i.e., IP header compression parameters) or header compression parameters for Ethernet (i.e., Ethernet header compression parameters), for example.

Similarly, in EPS, the PDN gateway control plane+session management function (PGW-C+SMF) node may provide the UE with the header compression parameters that may be used for the target system (in this example the target system being an N1 mode). Similarly, the UE upon entering and transferring the PDU session to the N1 mode may use the previously received parameters for the transferred PDU session.

The parameters that are provided by the source system (e.g., by the core network of EPS) in the PCO IE or EPCO IE may include the Ethernet header compression parameter or IP header compression parameter. Once received, the UE may consider the received parameters as the parameters to be used when the UE enters the target system (e.g., 5GS) for the PDU session that gets transferred.

Therefore, a new parameter may be defined for the (E)PCO IE, where this new parameter identifies header compression parameters for Ethernet. The parameter identifier may indicate, for example, Ethernet header compression for a target system, or Ethernet header compression parameters for an N1 mode (to be provided to the UE in an S1 mode), or Ethernet header compression parameters for the S1 mode (to be provided to the UE in the N1 mode). In addition to the parameter identifier, the (E)PCO IE may also contain the actual header compression parameters which would be the value part of the Ethernet header compression IE (if this IE gets defined in either [1] or [2]).

The skilled person will appreciate that this technique may be applied for IP header compression parameters.

In summary, in certain examples of the present disclosure, when the UE is in, for example, an S1 mode, the network (e.g., the PGW-C+SMF entity) may provide the UE with the Ethernet header compression parameters to be used in an N1 mode using a new parameter (e.g., parameter identifier and contents) in the (E)PCO that is sent to the UE in the ESM signaling, for example as part of the activate default EPS bearer request message or any other ESM message. When received in the UE, the UE may store these parameters and use them after an inter-system change to a target system (e.g., the N1 mode in this example) assuming that the PDU session is successfully transferred to the target system.

In certain examples of the present disclosure, the source system is an S1 mode and the target system is an N1 mode. However, the skilled person will appreciate that the techniques described herein may be applied if the source system is any other system, for example the N1 mode, and the target system is any other system, for example the S1 mode. Moreover, the skilled person will appreciate that the techniques described herein may be applied to other types of data and not just Ethernet data.

In certain examples, the techniques described herein, for the UE and/or the network, may be conditioned on the existence of the N26 interface in the network and/or the operation of the UE in single registration mode. However, the skilled person will appreciate that the techniques described herein may still be applied even if N26 is not supported in the network or even if the UE operates in dual registration mode.

3. Definition and Use of Ethernet Header Compression in EPS.

In certain examples of the present disclosure, in order to ensure that Ethernet header compression can be used across EPS and 5GS for sessions that are transferred between these systems, or in order to determine that the session can be transferred between EPS and 5GS, the EPS may implement mechanisms to indicate whether Ethernet header compression is supported on the EMM layer and the ESM layer.

For example, for the EMM layer, the techniques described above in the previous section may apply, for example, definition and use of a new bit that is sent by the UE in the UE network capability IE and that is sent by the network in the EPS network feature support IE.

For a UE that supports Ethernet header compression, and optionally when the network has indicated that the network supports (and implicitly indicates that the network allows the use of) Ethernet header compression for the UE, the UE may include a new IE, for example Header compression parameters for Ethernet IE, in the PDN connectivity request message.

The UE may also perform the bearer resource modification procedure (i.e., send a BEARER RESOURCE MODIFICATION REQUEST message) to negotiate the compression parameters for the PDN connection or per EPS bearer and include the new IE in the ESM message.

Similarly, in certain examples, the MME may include a new similar IE (indicating the negotiated header compression parameters) in the activate default EPS bearer context request message, optionally when the PDN connectivity request message includes the header compression parameter IE, for example the Header compression parameters for Ethernet IE.

Similarly, in certain examples, the MME may include a new similar IE (indicating the negotiated header compression parameters) in the Modify EPS bearer context request message, optionally in response to response to receiving a BEARER RESOURCE MODIFICATION REQUEST message with a new IE to (re-)negotiate the header compression parameters.

The skilled person will appreciate that the names of IEs described herein are provided as examples only, and that any other suitable names may be used.

The skilled person will appreciate that the techniques described herein may be applied in any suitable combination and may be applied to IP header compression and interworking of PDU sessions (or PDN connections) for the transfer of IP data. The skilled person will also appreciate that the techniques described herein may be applied to UEs that use control plane CIoT EPS optimization and/or control plane CIoT 5GS optimization but are not limited to these examples. The skilled person will appreciate that the techniques described herein may be applied to both 5GS (an N1 mode) and EPS (an S1 mode) accordingly. The skilled person will appreciate that techniques described herein may be used in any combination and/or order.

There are currently no descriptions or assumptions about the applicability of IP header compression (which is supported in both EPS and 5GS) when a session is transferred between an S1 mode or an N1 mode. Certain examples of the present disclosure specify the UE and network behavior in this case. For example, in certain examples the UE may continue using IP header compression for the session when the session is successfully transferred across the systems.

In certain examples of the present disclosure, Ethernet header compression by default only applies to 5GS. Therefore, when the UE goes to EPS, the UE may transfer the session but does not apply compression, optionally after negotiation with the network.

In certain examples of the present disclosure, the UE may always re-negotiate the compression parameters to be used (e.g., for IP or Ethernet data type) after every inter-system change. The UE may re-negotiate the parameters to use using the appropriate NAS signaling of the target system.

For an efficient and uninterrupted application of header compression for Ethernet data, in certain examples of the present disclosure, the NAS signaling in EPS may be updated such that the UE and the network may indicate their support for Ethernet header compression and also negotiate the relevant parameters. With this, the UE may then continue using the same Ethernet header compression parameters when a session is transferred between EPS and 5GS.

The skilled person will appreciate that the present disclosure is not limited to the examples summarized above.

For example, certain examples of the present disclosure provide a method, for a UE, wherein the UE is operating in a first mode (e.g., 5GS or EPS), and wherein a data session (e.g., PDU session or PDN connection) is established for the UE, the method comprising: switching from the first mode to a second mode (e.g., EPS or 5GS), including transferring the data session from the first mode to the second mode; and applying a policy to determine whether or not to apply header compression to the data session in the second mode.

In certain examples, applying the policy may comprise, if header compression is applied to the data session in the first mode, stopping applying header compression for the data session in the second mode.

In certain examples, applying the policy may comprise, if header compression is applied to the data session in the first mode, and header compression is not supported in the second mode, stopping applying header compression for the data session in the second mode.

In certain examples, applying the policy may comprise, if header compression is applied to the data session in the first mode, continuing to apply header compression for the data session in the second mode.

In certain examples, the method may further comprise negotiating one or more parameters for header compression in the second mode.

In certain examples, the data session may be first established in the first mode (and optionally one or more parameters for the header compression in the first mode have been negotiated, and optionally the switching is the first switching between modes for the data session), and the method may further comprise, if header compression is supported in the second mode (and optionally if the data session used header compression in the first mode), performing a data session modification procedure (e.g., a PDU session modification procedure or bearer resource modification procedure) to negotiate parameters for header compression in the second mode.

In certain examples, the negotiating may comprise transmitting (e.g., in a TAU request message or attach request message) an indicator (e.g., a bit provided in a UE network capability IE) for indicating that header compression (e.g., Ethernet header compression for CP CIoT EPS optimization) is supported in the second mode.

In certain examples, the method may further comprise using, for header compression in the second mode, one or more parameters corresponding to one or more parameters previously used for header compression in the first mode.

In certain examples, the parameters used for header compression in the first mode are associated with a QFI of the data session, wherein the parameters used for header compression in the second mode are associated with an EPS bearer identity that is associated with the QFI, and wherein the parameters associated with the QFI map to the parameters associated with the EPS bearer identity that is associated with the QFI.

In certain examples, the method may further comprise: switching from the second mode to the first mode, including transferring the data session from the second mode to the first mode; and if header compression is applied to the data session in the second mode, continuing to apply header compression to the data session in the first mode.

In certain examples, the method may further comprise negotiating one or more parameters for header compression in the first mode.

In certain examples, the method may further comprise: when switching from the first mode to a second mode, storing one or more parameters used for header compression in the first mode; and when switching from the second mode to the first mode, retrieving the stored parameters and using the retrieved parameters for header compression in the first mode.

In certain examples, the method may further comprise: receiving, from a network entity (e.g., SMF or PGW-C+SMAF), one or more parameters for header compression in the first mode or second mode; and storing the received parameters.

In certain examples, receiving parameters from the network entity may comprise receiving, while in the first mode, one or more parameters for header compression in the second mode (e.g., as part of a data session establishment procedure or data session modification procedure), and the method may further comprise applying the received parameters when in the second mode.

In certain examples, receiving parameters from the network entity may comprise receiving, while in the second mode, one or more parameters for header compression in the first mode (e.g., as part of a data session establishment procedure or data session modification procedure), and the method may further comprise applying the received parameters when in the first mode.

In certain examples, the header compression parameters may be identified in a parameter of (E)PCO IE, and/or the header compression parameters may be included in (E)PCO.

In certain examples, the header compression may comprise at least one of IP header compression, and Ethernet header compression.

Certain examples of the present disclosure provide a UE or network entity configured to operate according to a method of any of the preceding examples.

Certain examples of the present disclosure may provide a network comprising a network entity and/or a UE according to the preceding example.

Certain examples of the present disclosure provide a computer program comprising instructions which, when the program is executed by a computer or processor, cause the computer or processor to carry out a method according to any of the preceding examples.

Certain examples of the present disclosure provide a computer or processor-readable data carrier having stored thereon a computer program according to the preceding example.

FIG. 1 illustrates a block diagram of an exemplary network entity according to an embodiment of the present disclosure. In FIG. 1, the transmitter 103 and the receiver 105 may be implemented in a transceiver. For example, the transceiver may transmit a signal via the transmitter 103 and receive a signal via the receiver 105. For example, a UE, AMF, SMF, MME and/or any other suitable network entity may be provided in the form of the network entity illustrated in FIG. 1. The skilled person will appreciate that the network entity illustrated in FIG. 1 may be implemented, for example, as a network element on a dedicated hardware, as a software instance running on a dedicated hardware, or as a virtualized function instantiated on an appropriate platform, e.g., on a cloud infrastructure.

The entity 100 comprises a processor (or controller) 101, a transmitter 103 and a receiver 105. The receiver 105 is configured for receiving one or more messages or signals from one or more other network entities. The transmitter 103 is configured for transmitting one or more messages or signals to one or more other network entities. The processor 101 is configured for performing one or more operations and/or functions as described above. For example, the processor 101 may be configured for performing the operations of a UE, AMF, SMF and/or MME.

FIG. 2 illustrates a block diagram of a UE 200 according to an embodiment of the disclosure.

Referring to FIG. 2, the UE may include a transceiver 220, a memory 230, and a processor 210. The transceiver 220, the memory 230, and the processor 210 of the UE may operate according to the communication method of the UE described above. However, components of the UE are not limited thereto. For example, the UE may include more or less components than those shown in FIG. 2. In addition, the transceiver 220, the memory 230, and the processor 210 may be embodied in the form of a single chip.

The transceiver 220 may transmit and receive a signal to and from a base station. Here, the signal may include control information and data. In this regard, the transceiver 220 may include a radio frequency (RF) transmitter up-converting and amplifying a frequency of a transmitted signal and an RF receiver performing low-noise amplification on a received signal and down-converting a frequency. However, such components of the transceiver 220 are only examples, and are not limited to the RF transmitter and the RF receiver.

Also, the transceiver 220 may receive a signal via a wireless channel and output the signal to the processor 210, and transmit a signal output from the processor 210 via the wireless channel.

The memory 230 may store a program and data required for an operation of the UE. Also, the memory 230 may store control information or data included in a signal obtained by the UE. The memory 230 may include a storage medium, such as read-only memory (ROM), random-access memory (RAM), a hard disk, a CD-ROM, or a DVD, or a combination thereof. Also, the memory 230 may include a plurality of memories. According to an embodiment of the disclosure, the memory 230 may store a program for performing header compression according to embodiments of the present disclosure.

The processor 210 may control a series of processes such that the UE operates according to the embodiment of the disclosure. For example, the processor 210 may control the transceiver 220 and the memory 230 to perform random access according to embodiments of the present disclosure. Here, in relation to operations of the processor 210, only some of the operations of the embodiments of the disclosure have been described, but the processor 210 may control all processes such that the UE may operate according to all or some of the embodiments of the disclosure.

FIG. 3 illustrates a block diagram of a core network entity 300, according to an embodiment of the disclosure.

Referring to FIG. 3, the core network entity may include a transceiver 320, a memory 330, and a processor 310. The transceiver 320, the memory 330, and the processor 310 of the core network entity may operate according to the communication method of the core network entity described above. However, components of the core network entity are not limited thereto. For example, the core network entity may include more or less components than those shown in FIG. 3. In addition, the transceiver 320, the memory 330, and the processor 310 may be embodied in the form of a single chip. According to an embodiment, the core network entity may include entities included in a base station and a core network. The core network entity may include the NF described above, and for example, may include an AMF, an SMF, and the like. In various embodiments, the core network entity may refer to a network entity.

The transceiver 320 may transmit and receive a signal to and from a UE, a core network entity, or a base station. Here, the signal may include control information and data. In this regard, the transceiver 320 may include an RF transmitter up-converting and amplifying a frequency of a transmitted signal and an RF receiver performing low-noise amplification on a received signal and down-converting a frequency. However, such components of the transceiver 320 are only examples, and are not limited to the RF transmitter and the RF receiver.

Also, the transceiver 320 may receive a signal via a wireless channel and output the signal to the processor 310, and transmit a signal output from the processor 310 via the wireless channel.

The memory 330 may store a program and data required for an operation of the core network entity. Also, the memory 330 may store control information or data included in a signal obtained by the core network entity. The memory 330 may include a storage medium, such as read-only memory (ROM), random-access memory (RAM), a hard disk, a CD-ROM, or a DVD, or a combination thereof. Also, the memory 330 may include a plurality of memories. According to an embodiment of the disclosure, the memory 330 may store a program for supporting beam-based cooperative communication.

The processor 310 may control a series of processes such that the core network entity operates according to the embodiment of the disclosure. The processor 310 may perform only some operations of the embodiments of the disclosure, but alternatively, may control all processes such that the core network entity may operate according to all or some of the embodiments of the disclosure.

The techniques described herein may be implemented using any suitably configured apparatus and/or system. Such an apparatus and/or system may be configured to perform a method according to any aspect, embodiment, example or claim disclosed herein. Such an apparatus may comprise one or more elements, for example one or more of receivers, transmitters, transceivers, processors, controllers, modules, units, and the like, each element configured to perform one or more corresponding processes, operations and/or method steps for implementing the techniques described herein. For example, an operation/function of X may be performed by a module configured to perform X (or an X-module). The one or more elements may be implemented in the form of hardware, software, or any combination of hardware and software.

It will be appreciated that examples of the present disclosure may be implemented in the form of hardware, software or any combination of hardware and software. Any such software may be stored in the form of volatile or non-volatile storage, for example a storage device like a ROM, whether erasable or rewritable or not, or in the form of memory such as, for example, RAM, memory chips, device or integrated circuits or on an optically or magnetically readable medium such as, for example, a CD, DVD, magnetic disk or magnetic tape or the like.

It will be appreciated that the storage devices and storage media are embodiments of machine-readable storage that are suitable for storing a program or programs comprising instructions that, when executed, implement certain examples of the present disclosure. Accordingly, certain example provide a program comprising code for implementing a method, apparatus or system according to any example, embodiment, aspect and/or claim disclosed herein, and/or a machine-readable storage storing such a program. Still further, such programs may be conveyed electronically via any medium, for example a communication signal carried over a wired or wireless connection.

While the present disclosure has been shown and described with reference to certain examples, it will be understood by those skilled in the art that various changes in form and detail may be made therein without departing from the scope of the present disclosure, as defined by the appended claims.

Although the present disclosure has been described with various embodiments, various changes and modifications may be suggested to one skilled in the art. It is intended that the present disclosure encompass such changes and modifications as fall within the scope of the appended claims.

What is claimed is:

1. A method of a user equipment (UE) in a wireless communication system, the method comprising:
identifying an inter-system change from a first mode to a second mode;
transmitting, to a network entity, a request message including first information related to whether a header compression for control plane CIoT 5GS optimization is supported by the UE, wherein the first information is indicated by a value included in a capability information element (IE) of the request message;
receiving, from the network entity, an accept message including second information related to whether the header compression is supported by the network entity; and
based on the first information indicating that the header compression is supported at the UE, the second information indicating that the header compression is supported at the network entity, the UE operating in a single-registration mode in the network entity supporting an N26 interface, initiating a modification procedure for negotiating header compression configuration,
wherein in case that the first mode is a S1 mode and the second mode is a N1 mode, the request message is a message for requesting registration, and
wherein the header compression configuration is negotiated based on the modification procedure.

2. The method of claim 1, wherein the value indicates 1 when the header compression is supported and the value indicates 0 when the header compression is not supported.

3. The method of claim 1, wherein the accept message includes a network feature support information element (IE), and the second information is indicated by a value of the network feature support IE, and
wherein the value of the network feature support IE indicates 1 when the header compression is supported and the value indicates 0 when the header compression is not supported.

4. The method of claim 1, wherein the header compression is internet protocol (IP) header compression when the first mode is the N1 mode and the second mode is the S1 mode.

5. The method of claim 1, wherein the header compression is one of IP header compression or Ethernet header compression when the first mode is the S1 mode and the second mode is the N1 mode.

6. The method of claim 1, wherein in case that the first mode is the N1 mode and the second mode is the S1 mode, the request message is a message for requesting tracking area update.

7. A method of a network entity for an inter-system change from a first mode to a second mode in a wireless communication system, the method comprising:
- receiving, from a user equipment (UE), a request message including first information related to whether a header compression for control plane CIoT 5GS optimization is supported by the UE, wherein the first information is indicated by a value included in a capability information element (IE) of the request message; and
- transmitting, to the UE, an accept message including second information related to whether the header compression is supported by the network entity,
- wherein based on the first information indicating that the header compression is supported at the UE, the second information indicating that the header compression is supported at the network entity, the UE operating in a single-registration mode in the network entity supporting an N26 interface, a modification procedure for negotiating header compression configuration is initiated,
- wherein in case of the inter-system change of the UE from the first mode, a S1 mode, to the second mode, a N1 mode, the request message is a message for requesting registration, and
- wherein the header compression configuration is negotiated based on the modification procedure.

8. The method of claim 7, wherein the value indicates 1 when the header compression is supported and the value indicates 0 when the header compression is not supported.

9. The method of claim 7, wherein the accept message includes a network feature support information element (IE), and the second information is indicated by a value of the network feature support IE, and
- wherein the value of the network feature support IE indicates 1 when the header compression is supported and the value indicates 0 when the header compression is not supported.

10. The method of claim 7, wherein the header compression is internet protocol (IP) header compression when the first mode is the N1 mode and the second mode is the S1 mode.

11. The method of claim 7, wherein the header compression is one of IP header compression or Ethernet header compression when the first mode is the S1 mode and the second mode is the N1 mode.

12. The method of claim 7, wherein in case of the inter-system change of the UE from the first mode, a N1 mode, to the second mode, a S1 mode, the request message is a message for requesting tracking area update.

13. A user equipment (UE) in a wireless communication system, the UE comprising:
- a transceiver; and
- at least one processor operably connected to the transceiver, the at least one processor configured to:
  - identify an inter-system change from a first mode to a second mode;
  - transmit, to a network entity, a request message including first information related to whether a header compression for control plane CIoT 5GS optimization is supported by the UE, wherein the first information is indicated by a value included in a capability information element (IE) of the request message;
  - receive, from the network entity, an accept message including second information related to whether the header compression is supported by the network entity; and
  - based on the first information indicating that the header compression is supported at the UE, the second information indicating that the header compression is supported at the network entity, the UE operating in a single-registration mode in the network entity supporting an N26 interface, initiate a modification procedure for negotiating header compression configuration,
- wherein in case that the first mode is a S1 mode and the second mode is a N1 mode, the request message is a message for requesting registration, and
- wherein the header compression configuration is negotiated based on the modification procedure.

14. The UE of claim 13, wherein the value indicates 1 when the header compression is supported and the value indicates 0 when the header compression is not supported.

15. The UE of claim 13, wherein the accept message includes a network feature support information element (IE), and the second information is indicated by a value of the network feature support IE, and
- wherein the value of the network feature support IE indicates 1 when the header compression is supported and the value indicates 0 when the header compression is not supported.

16. The UE of claim 13, wherein the header compression is internet protocol (IP) header compression when the first mode is the N1 mode and the second mode is an S1 mode, and
- wherein the header compression is one of IP header compression or Ethernet header compression when the first mode is the S1 mode and the second mode is the N1 mode.

17. The UE of claim 13, wherein in case that the first mode is a N1 mode and the second mode is a S1 mode, the request message is a message for requesting tracking area update.

* * * * *